United States Patent
Schoch et al.

(10) Patent No.: US 11,892,020 B2
(45) Date of Patent: Feb. 6, 2024

(54) CONNECTION ASSEMBLY

(71) Applicant: Elkamet Kunststofftechnik GmbH, Biedenkopf (DE)

(72) Inventors: Andreas Schoch, Marburg (DE); Juergen Ruehl, Reichelsheim (DE); Marcus Schneider, Dautphetal (DE); David Landeck, Bad Berleburg (DE); Michael Ortmueller, Dautphetal-Herzhausen (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 138 days.

(21) Appl. No.: 17/640,346

(22) PCT Filed: Sep. 3, 2020

(86) PCT No.: PCT/EP2020/074636
§ 371 (c)(1),
(2) Date: Mar. 4, 2022

(87) PCT Pub. No.: WO2021/043920
PCT Pub. Date: Mar. 11, 2021

(65) Prior Publication Data
US 2022/0341455 A1    Oct. 27, 2022

(30) Foreign Application Priority Data
Sep. 6, 2019  (DE) ................... 10 2019 123 996.6

(51) Int. Cl.
*F16B 21/08*   (2006.01)
*B65D 43/02*   (2006.01)
*F16B 21/07*   (2006.01)

(52) U.S. Cl.
CPC .......... *F16B 21/084* (2013.01); *B65D 43/021* (2013.01); *F16B 21/073* (2013.01);
(Continued)

(58) Field of Classification Search
CPC ............ B65D 2251/20; B65D 43/0216; B65D 43/0214; B65D 43/022; B65D 43/0206;
(Continued)

(56) References Cited

U.S. PATENT DOCUMENTS 1,303,401 A * 5/1919 Sanger ............... A44B 17/0011
24/676
1,309,586 A * 7/1919 Nelson ............... A44B 17/0011
16/4
(Continued)

FOREIGN PATENT DOCUMENTS

DE          9413655 U1    11/1994
DE   102016103774 A1 *   9/2017  .............. F16B 12/14
(Continued)

OTHER PUBLICATIONS

English Translation of JP-H09282809-A (Year: 1997).*

*Primary Examiner* — Jason L Vaughan
(74) *Attorney, Agent, or Firm* — LEYDIG, VOIT & MAYER, LTD.

(57) ABSTRACT

A connection assembly includes first and second components joinable along an axis of relative movement, starting from a separated disassembled state, into an interconnected assembled state, and transferable back into the disassembled state. The first component has a latching element and the second component has a latching element receptacle which cooperates with latching portions of the latching element in the assembled state. The latching portions are offset relative to each other when viewed in a circumferential direction, and are each movable along a movement path starting from (Continued)

a non-deformed rest state. A first portion of the movement path points in a disassembly direction, and a second portion of the movement path points in an assembly direction opposite the disassembly direction. The first portion of the movement path is limited by a stop against which the latching element rests in a course of disassembling the components.

20 Claims, 15 Drawing Sheets

(52) U.S. Cl.
CPC .......... *F16B 21/078* (2013.01); *F16B 21/088* (2013.01); *B65D 2543/00194* (2013.01); *B65D 2543/00518* (2013.01); *B65D 2543/00546* (2013.01); *B65D 2543/00972* (2013.01)

(58) Field of Classification Search
CPC ..... F16L 23/162; F16L 15/04; A44B 17/0011; A44B 17/0017; F16B 21/084; F16B 21/073; F16B 21/078; F16B 21/088
See application file for complete search history.

(56) References Cited

U.S. PATENT DOCUMENTS

| | | | | |
|---|---|---|---|---|
| 1,574,710 A | * | 2/1926 | Spreen | B65D 43/022 220/592.14 |
| 2,134,037 A | * | 10/1938 | Fenton | A44B 17/0011 24/692 |
| 2,817,134 A | * | 12/1957 | Fenton | F16B 21/06 24/692 |
| 3,083,430 A | * | 4/1963 | Shears | F16B 21/078 D11/220 |
| 3,144,659 A | * | 8/1964 | Matthews | A41D 13/1236 D2/714 |
| 3,380,610 A | * | 4/1968 | Krieps | B65D 43/022 215/320 |
| 4,043,482 A | * | 8/1977 | Brown | B65D 43/0206 220/795 |
| 4,719,674 A | * | 1/1988 | Kit | A44B 17/0011 24/108 |
| 4,847,959 A | * | 7/1989 | Shimada | F16B 21/078 24/671 |
| 5,660,513 A | | 8/1997 | Shibanushi | |
| 6,588,618 B1 | * | 7/2003 | Davis | B44D 3/127 220/284 |
| 9,145,238 B2 | * | 9/2015 | Barreto | B65D 47/32 |
| 9,675,143 B2 | * | 6/2017 | Brigato | A44B 17/0011 |
| 10,194,718 B2 | * | 2/2019 | Raccosta | A44B 17/0011 |
| 10,278,457 B2 | * | 5/2019 | Hayashi | A44B 17/0005 |
| 10,414,259 B2 | * | 9/2019 | Ortmueller | B60J 10/70 |
| 2006/0081635 A1 | * | 4/2006 | Matsutori | H01L 21/67769 220/806 |
| 2007/0134073 A1 | | 6/2007 | Shereyk et al. | |
| 2011/0115261 A1 | * | 5/2011 | Platt | B60J 10/265 296/208 |
| 2011/0285177 A1 | * | 11/2011 | Flammer | B60J 10/265 296/208 |
| 2014/0327267 A1 | * | 11/2014 | Deussen | B60J 10/20 296/93 |

FOREIGN PATENT DOCUMENTS

| | | |
|---|---|---|
| DE | 102016012899 A1 | 5/2018 |
| DE | 102016012901 A1 | 5/2018 |
| EP | 0064768 A2 | 11/1982 |
| EP | 2941977 A1 | 11/2015 |
| JP | H09252809 A | 9/1997 |

* cited by examiner

US 11,892,020 B2

CONNECTION ASSEMBLY

CROSS REFERENCE TO RELATED APPLICATIONS

This application is a U.S. National Phase application under 35 U.S.C. § 371 of International Application No. PCT/EP2020/074636, filed on Sep. 3, 2020, and claims benefit to German Patent Application No. DE 10 2019 123 996.6, filed on Sep. 6, 2019. The International Application was published in German on Mar. 11, 2021 as WO 2021/043920 A1 under PCT Article 21(2).

FIELD

The invention relates to a connection assembly including a first component and a second component which can be joined together along an axis of relative movement, starting from a separated disassembled state, into an interconnected assembled state, and which can be transferred back into the disassembled state, the first component being provided with at least one latching element which surrounds the axis of relative movement in an annular or segment-shaped manner, and the second component being provided with at least one latching element receptacle which surrounds the axis of relative movement in an annular or segment-shaped manner and cooperates with at least two latching portions of the at least one latching element in the assembled state, the latching portions being offset relative to each other when viewed in the circumferential direction.

BACKGROUND

A connection assembly of this kind in the form of what is commonly referred to as a snap fastener is known from DE 10 2016 012 899 A1, for example. In practice, such connection assemblies have proven useful in particular in installation situations where relatively low holding forces are required, for example for a jacket closure. While an increase of the holding forces, for example for attachment of a convertible top to a convertible-top frame, can be achieved with snap fasteners, this comes at the expense of the disadvantage that the assembly forces for joining the two snap fastener parts are also greatly increased.

SUMMARY

In an embodiment, the present invention provides a connection assembly. The connection includes a first component and a second component which are joinable to each other along an axis of relative movement, starting from a separated disassembled state, into an interconnected assembled state, and which are transferable back into the disassembled state. The first component has at least one latching element which surrounds the axis of relative movement in an annular or segment-shaped manner. The second component has at least one latching element receptacle which surrounds the axis of relative movement in an annular or segment-shaped manner and cooperates with at least two latching portions of the at least one latching element in the assembled state. The latching portions are offset relative to each other when viewed in a circumferential direction. The at least two latching portions of the at least one latching element are each movable along a movement path starting from a non-deformed rest state. The movement path has at least a component parallel to the axis of relative movement. A first portion of the movement path points in a disassembly direction with respect to the rest state, and a second portion of the movement path points in an assembly direction opposite the disassembly direction with respect to the rest state. The first portion of the movement path is limited by at least one stop against which the at least one latching element rests in a course of disassembling the first and second components.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3b is an enlarged view of a portion labeled IIIb in FIG. 3a;

DETAILED DESCRIPTION

Figure 1:
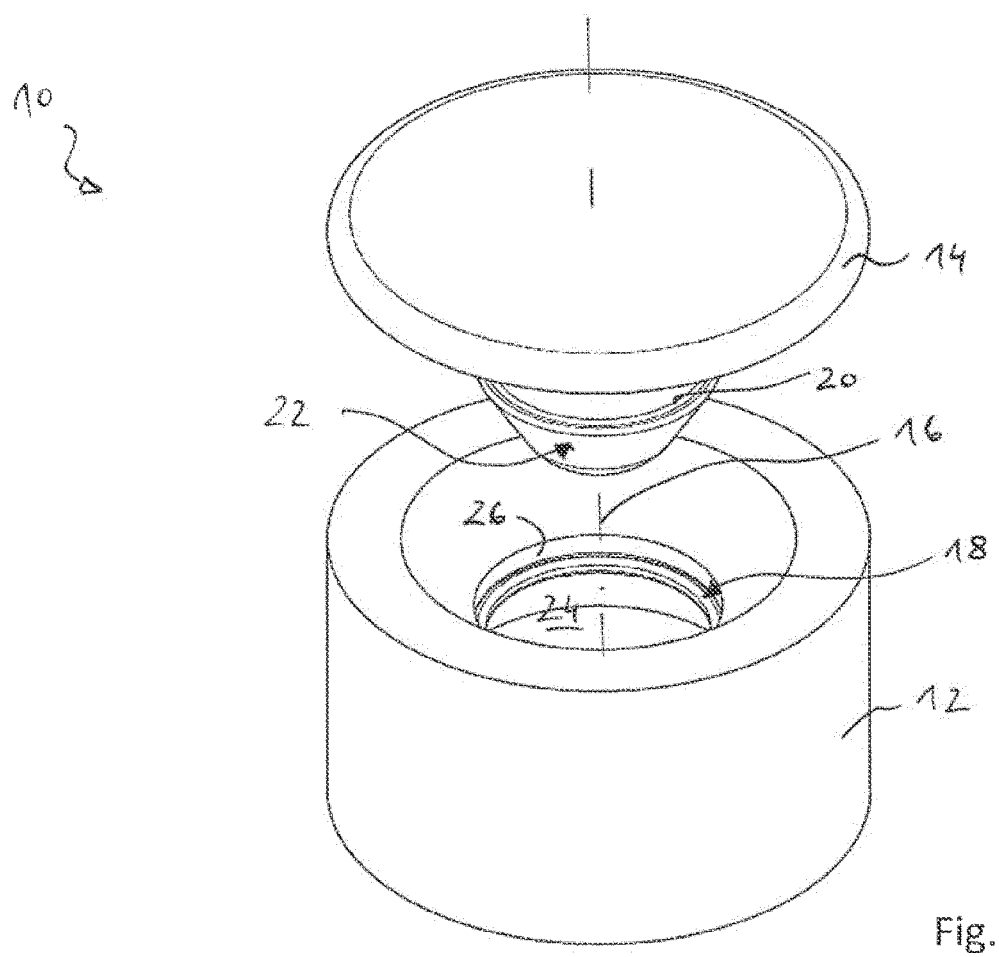
FIG. 1 is a perspective view showing a first embodiment of a connection assembly in a disassembled state.

Embodiments of the present invention improve a connection assembly of the above-mentioned type in such a way that increased holding forces need not necessarily be accompanied by increased assembly forces.

In a connection assembly of the above-mentioned type, that is improved in such a way that increased holding forces need not necessarily be accompanied by increased assembly forces according to an embodiment of the present invention, it is provided that the latching portions of the at least one latching element are each movable along a movement path starting from a non-deformed rest state, which movement path has at least a component parallel to the axis of relative movement, a first portion of the movement path pointing in a disassembly direction with respect to the rest state, and a second portion of the movement path pointing in an assembly direction opposite the disassembly direction with respect to the rest state, the first portion of the movement path being limited by at least one stop against which the at least one latching element rests in the course of disassembling the components.

In accordance with an embodiment of the present invention, a movement path is provided along which the latching portions of the at least one latching element can move, the movement path having at least a component parallel to the axis of relative movement. Starting from a non-deformed rest state of the latching element, the latching portions are movable in two opposite directions. In this context, the terms "disassembly direction" and "assembly direction" refer to movement of the second component relative to the first component, assuming that the first component is stationary. At least the first portion of the movement path, which points in the direction of disassembly with respect to the rest state, is limited by at least one stop against which the at least one latching element rests in the course of disassembling the components.

By providing the mentioned movement possibilities for the latching portions of the at least one latching element, the assembly forces required to join the connection assembly are relatively small. The provision of a stop makes it possible to hamper disassembly of the connection assembly in such a way that high holding forces act when the connection assembly is in the assembled state. Therefore, in order to release the connection assembly, relatively high disassembly forces must be exerted.

It is advantageous if the length of the first portion of the movement path differs from the length of the second portion of the movement path, so that different assembly and disassembly forces can be predetermined by the lengths of the respective movement paths. It is particularly preferred if the length of the first portion of the movement path is shorter than the length of the second portion of the movement path, which may be associated with the disassembly forces for releasing the connection assembly being higher than the assembly forces for joining the connection assembly.

The stop against which the at least one latching element rests in the course of disassembling the components is advantageously disposed on the first component, so that the length of the first movement path can be predetermined solely or substantially by the geometry of the first component.

Advantageously, the latching element is springy in its entirety or at least in a portion thereof. It is preferred that the latching element, or at least portions thereof, be made of a springy material, for example of a thermoplastic elastomer. However, the latching element may also be made of other plastic materials or also of metallic materials.

Furthermore, it is preferred if the at least one latching element, when in its rest state, extends along a plane that is oblique or perpendicular to the axis of relative movement when viewed in a cross-sectional plane parallel to the axis of relative movement. By orienting the mentioned plane at an angle to the axis of relative movement, the ratio between the assembly force and the dismantling force may possibly be additionally influenced.

Further, it is preferred if the at least one latching element extends between a mounting portion and a free end when viewed in a cross-sectional plane parallel to the axis of relative movement, the mounting portion being in particular annularly shaped and connected to the first component, and the free end being pivotable relative to the mounting portion along or parallel to the movement path. Such a latching element enables stable attachment of the latching element to the first component. It is preferred that a latching portion of the at least one latching element that cooperates with the latching element receptacle of the second component be disposed in the region of the free end of the latching element or adjacent thereto.

For a cross-sectional shape of the latching element as described above, a first pivot angle corresponding to the first portion of the movement path may be at least about 5° and/or no more than about 100°. With the mentioned angular ranges, it is possible to combine high holding forces with moderate disassembly forces.

It is also proposed that a second pivot angle corresponding to the second portion of the movement path be at least about 10°. In this way, relatively low assembly forces can be obtained.

Advantageously, the latching element receptacle is formed by a projection of material which extends in the radial direction relative to the axis of relative movement and which forms an undercut for receiving a latching portion when the connection assembly is in the assembled state. The projection of material extending in the radial direction may extend both radially outwardly and radially inwardly.

A refinement provides that the connection assembly have at least one sealing element which annularly surrounds the axis of relative movement and which provides a sealing effect between the first component and the second component when the connection assembly is in the assembled state. Thus, the connection assembly at the same time forms a sealing assembly.

It is also possible that the first component and/or the second component may have a recess or cut-out for accommodating a third component and/or an opening for passage of a fluid therethrough. In this way, the function of the connection assembly can be extended by the function of a third component and/or the passage of a fluid therethrough. This is advantageous, for example, for hose connectors that are connected to each other or to a fluid container.

An embodiment of the present invention provides that an adjusting device be provided that is at least indirectly connected to the first component or to the second component, the relative position of the first component and the second component being adjustable along the axis of relative movement by means of the adjusting device when the connection assembly is in the assembled state. This adjustment of the relative position is preferably accompanied by a corresponding movement of the latching portions of the at least one latching element, which makes it possible, for example, to adjust a distance of the at least one latching element to the stop.

It is conceivable that the aforementioned adjusting device may act as a disassembly device that transfers the connection assembly from the assembled state into the disassembled state. Thus, the adjusting device may be used in a manner similar to a puller to separate the two components from each other, starting from their assembled state.

A particularly preferred example of an adjusting device is a threaded coupling whose coupling axis extends parallel to or in line with the axis of relative movement, and where a first thread portion is associated with a screwing element, and a second thread portion threadingly coupled to the first thread portion is associated with the first component or the second component.

The connection assembly according to an embodiment of the present invention is suitable in particular for a snap fastener assembly, where the first component is provided with a head and the second component is provided with a head receptacle, or where the first component is provided with a head receptacle and the second component is provided with a head.

However, the connection assembly according to an embodiment of the present invention is also suitable for a container assembly, where one of the two components is provided in the form of a receptacle bounding a cavity and the other of the two components is provided in the form of a cover.

The connection assembly according to an embodiment of the present invention is suitable in particular for the use, for the manufacture and/or for the operation of a technical medical device. The advantages of the connection assembly (moderate assembly forces combined with high holding forces) are particularly useful in the field of medical device technology.

Further features and advantages of embodiments of the present invention will be apparent from the following description and graphical representation of preferred exemplary embodiments.

Figure 2:
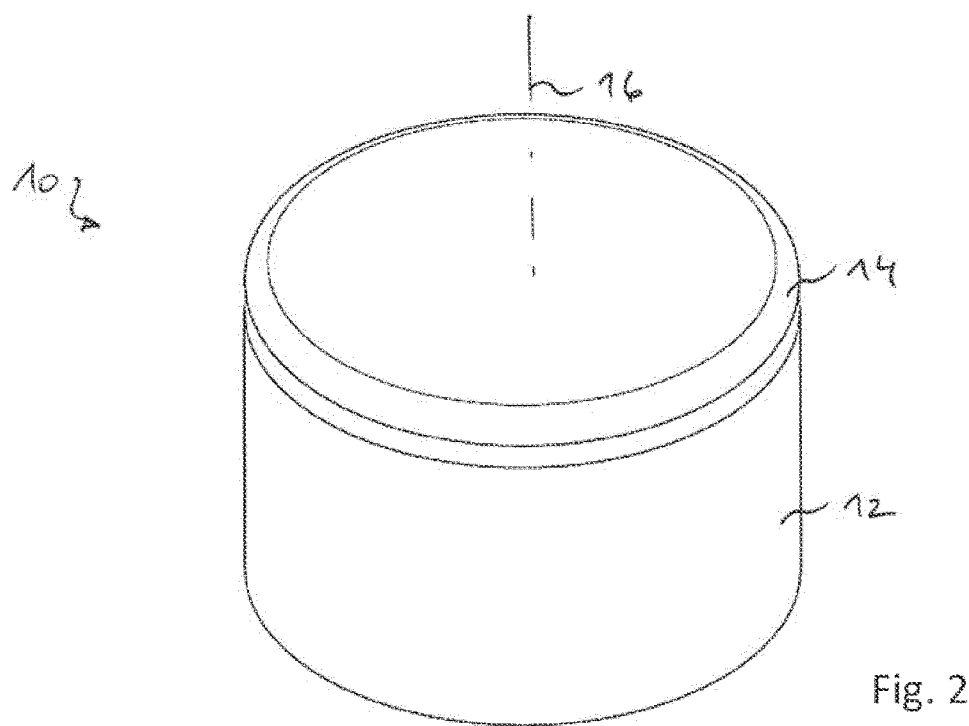
FIG. 2 is a perspective view showing the embodiment of FIG. 1 in an assembled state.

An embodiment of a connection assembly is designated in its entirety by reference numeral 10 in the drawing. The connection assembly includes a first component 12 and a second component 14, which can be transferred from a non-joined, disassembled state (see FIG. 1) to a joined, assembled state (see FIG. 2). Starting from the assembled state, components 12 and 14 can also be released from each other and returned into the disassembled state, and can also be transferred into the assembled state again.

Assembly and disassembly of components 12 and 14 is effected along an axis of relative movement 16, which forms a central axis of connection assembly 10 relative to a latching element 18 disposed on first component 12 and relative to a latching element receptacle 20 disposed on second component 14.

Latching element receptacle 20 is provided on a head 22 of second component 14. Head 22 is insertable into and removable from a cavity 24 in the form of a head receptacle of first component 12.

Head receptacle 24 is delimited along the axis of relative movement 16 by an entrance 26. Entrance 26 is circumferentially bounded by a first peripheral surface 28 (see FIG. 3a) which extends cylindrically about the axis of relative movement 16. First peripheral surface 28 adjoins a stop 30 which extends annularly about the axis of relative movement 16, and specifically within a plane perpendicular to the axis of relative movement 16. Stop 30 extends from first peripheral surface 28 radially outwardly up to a second peripheral surface 32 which has a larger radius than first peripheral surface 28 and which also extends cylindrically about the axis of relative movement 16.

Due to the offset between first peripheral surface 28 and second peripheral surface 32, a protected undercut region is formed which serves to accommodate and secure a mounting portion 34 of latching element 18. Latching element 18 extends between a mounting portion 34 and a latching portion 36 when viewed in cross section.

Mounting portion 34 is preferably annularly shaped and extends over an angle of 360° about the axis of relative movement 16.

Latching portion 36 extends over an angle of, for example, 180° about the axis of relative movement 16 and is disposed opposite a second latching portion 38 of latching element 18 (or of a second latching element). This second latching portion 38 may also extend over an angle of 180° about the axis of relative movement 16, so that the two latching portions 36 and 38 may complement each other to form a closed ring shape about the axis of relative movement 16.

Latching element 18 extends along a plane 40 between mounting portion 34 and the respective latching portion 36, 38 when viewed in cross section. Plane 40 extends at an angle to the axis of relative movement 16 and relates to a non-deformed rest state of latching element 18.

Figure 3A:
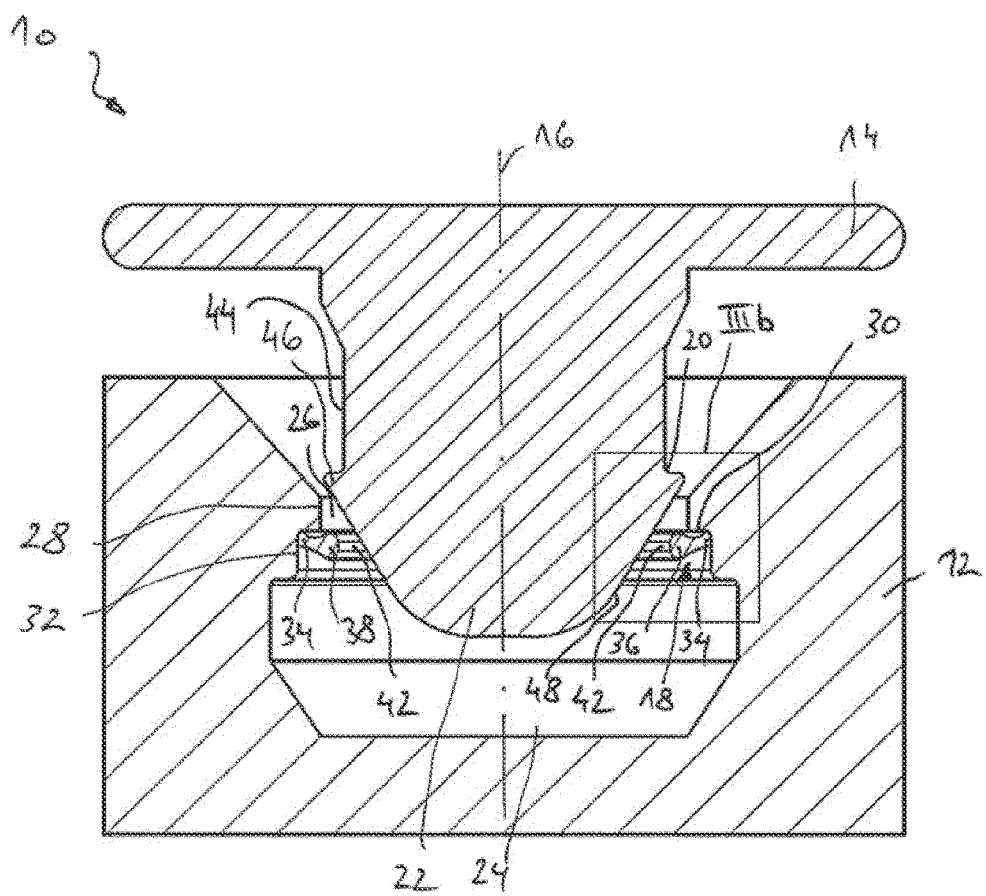
FIG. 3a is a vertical sectional view showing the embodiment of FIG. 1 in the disassembled state.
Figure 3B:
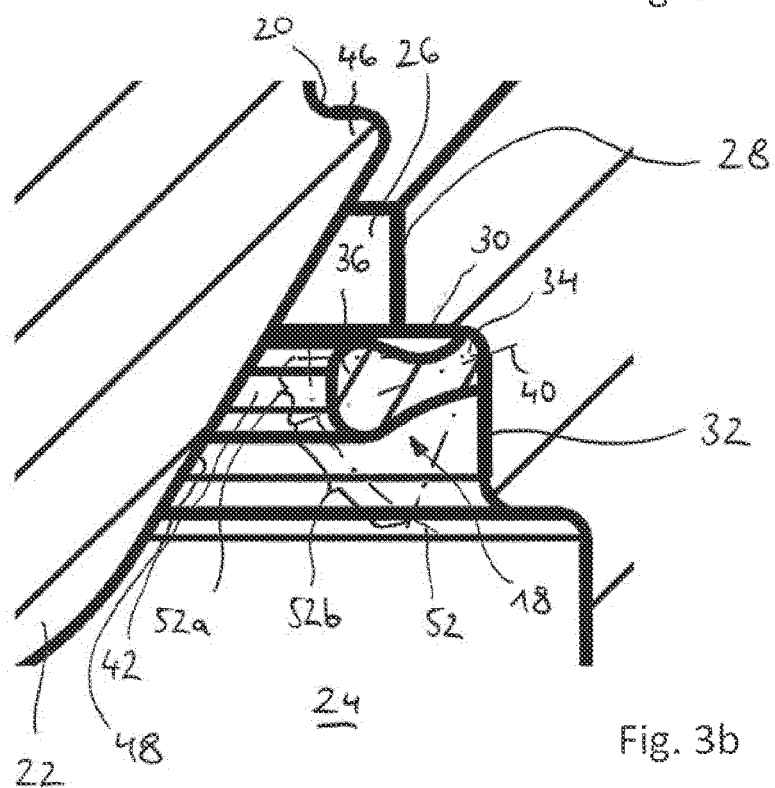

In the rest state shown in FIG. 3a, latching portions 36 and 38 are spaced a distance from stop 30, as is also clearly apparent from FIG. 3b.

Latching element 18 is made of a springy material, for example of a thermoplastic elastomer. Since latching element 18 is connected to first component 12 only in the region of mounting portion 34, a free end 42 and the adjacent latching portion 36, 38 are pivotable about or relative to mounting portion 34, which will be explained in more detail below.

Latching element receptacle 20 of second component 14 is radially inwardly bounded by an in particular cylindrical stem 44 and by a projection of material 46 extending radially outwardly from stem 44.

The projection of material 46 adjoins an abutment surface 48 which is inclined relative to the axis of relative movement 16 and which extends conically about the axis of relative movement 16.

Starting from the non-deformed rest state of latching element 18, latching portions 36 and 38 are each pivotable about or relative to mounting portion 34 along an arc-shaped movement path 52 (see FIG. 3b).

Figure 4:
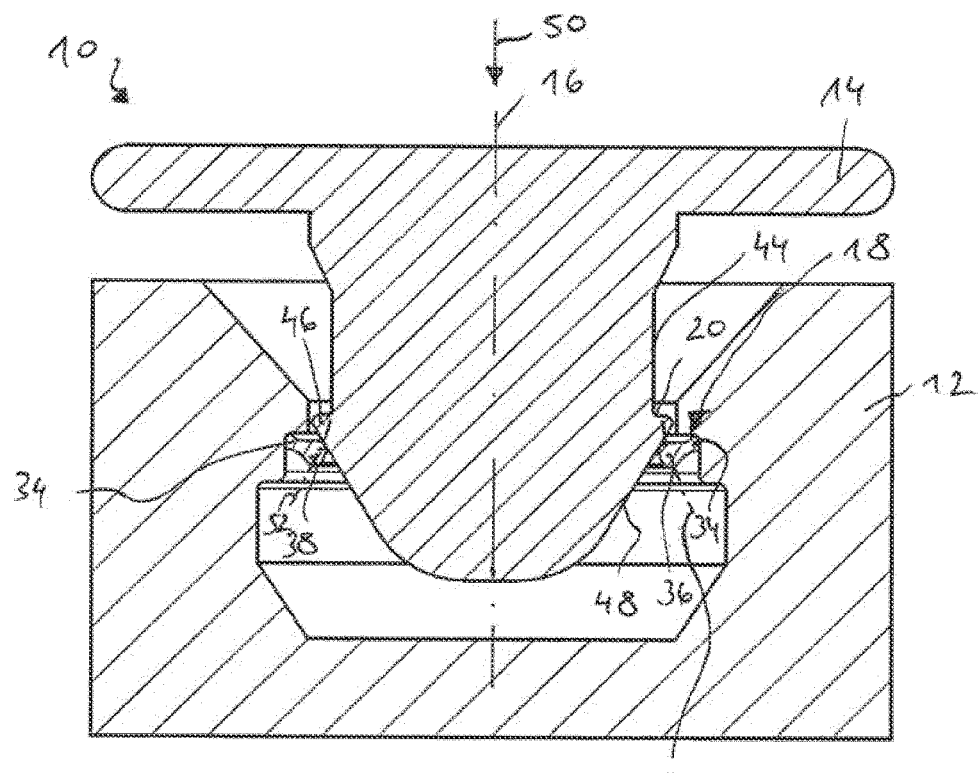
FIG. 4 is a vertical sectional view corresponding to FIG. 3a during a first phase of an assembly process.

When second component 14; i.e., head 22 of second component 14, is introduced along the axis of relative movement 16 into head receptacle 24 of first component 12, second component 14 is moved along the axis of relative movement 16 in an assembly direction 50 toward first component 12. During this process, abutment surface 48 comes into contact with the latching portions 36 and 38 of latching element 18 (see FIG. 4). In this context, starting from the non-deformed rest state of latching element 18, a portion of movement path 52 which has at least a component parallel to assembly direction 50 is referred to as the second portion 52b of movement path 52 (see FIG. 3b).

Figure 5:
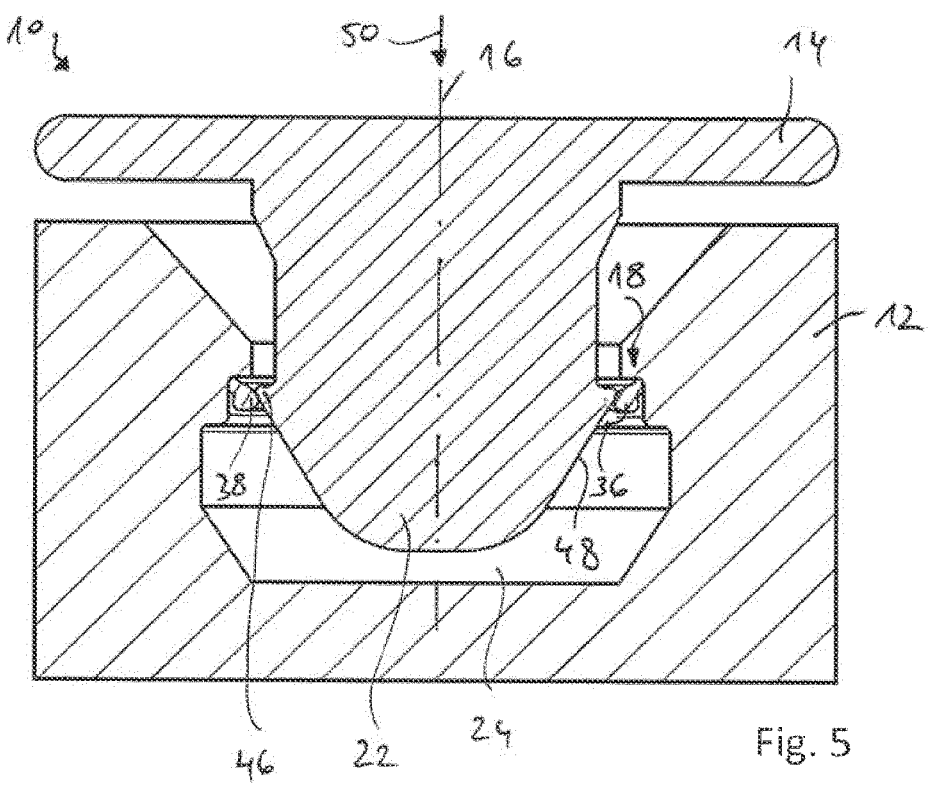
FIG. 5 is a vertical sectional view corresponding to FIG. 3a during a second phase of an assembly process.

In the course of assembling the components 12 and 14, latching portions 36 and 38 slide along abutment surface 48 of head 22, during which process they are increasingly pivoted along the mentioned second portion 52b of movement path 52 and thereby at the same time moved radially outwardly with respect to the non-deformed rest state (see FIG. 5).

As a result of the radially outward movement, the size of an aperture delimited between latching portions 36 and 38 is finally as large as the maximum diameter of projection 46. During further movement of second component 14 along assembly direction 50, this results in the latching portions 36 and 38 of latching element 18 springing back to their non-deformed rest state along the second portion 52*b* of movement path 52 after having overridden the projection 46 (see FIG. 6). In this condition, latching portions 36 and 38 of latching element 18 are received in latching element receptacle 20 of second component 14; the assembled state of connection assembly 10 is reached.

In this assembled state, it is possible that a free end 54 of head 22 may be in contact with a boundary surface 56 of the head receptacle 24, thereby preventing further movement of second component 14 along the axis of relative movement 16 in assembly direction 50. Alternatively or additionally, such further movement may be prevented by an annularly shaped circumferential sealing element 57, schematically shown in FIG. 6, which acts between first component 12 and second component 14.

Figure 6:
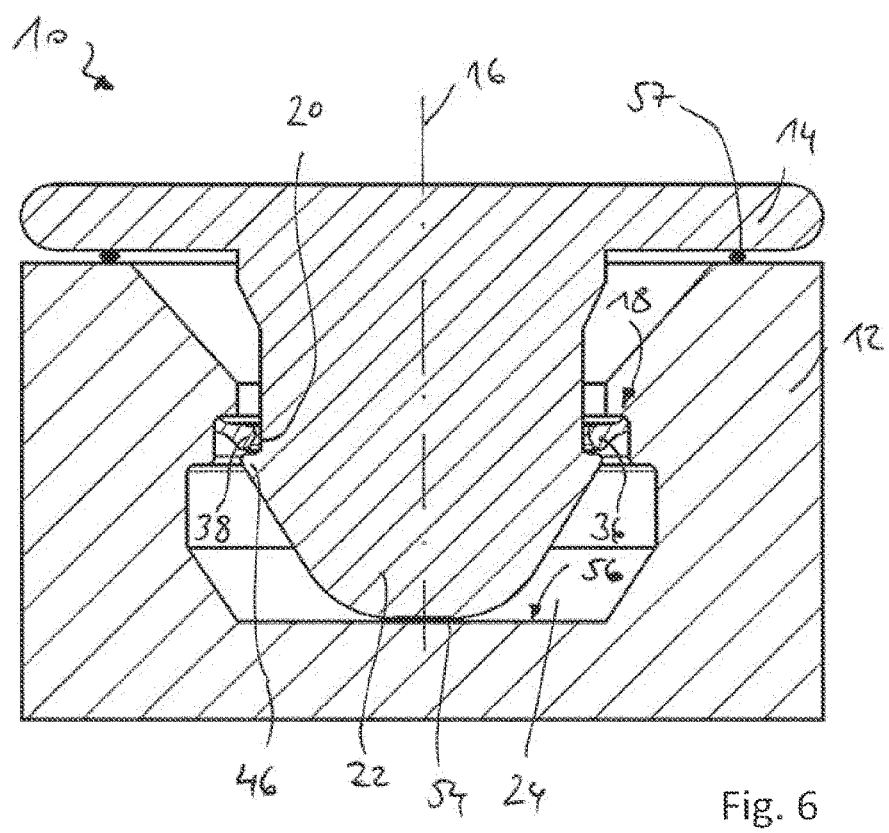
FIG. 6 is a vertical sectional view showing the embodiment of FIG. 1 in the assembled state.

Starting from the assembled state of connection assembly 10 shown in FIG. 6, connection assembly 10 can be disassembled by moving second component 14 along the axis of relative movement 16 in a disassembly direction 58 opposite to assembly direction 50. During this process, head 22 of second component 14 is removed from head receptacle 24 of first component 12. During disassembly of components 12 and 14, latching portions 36, 38 of latching element 18 are pivoted along movement path 52, starting from the non-deformed rest state shown in FIG. 6 along a first portion 52*a* of movement path 52 (see FIG. 3*b*). First portion 52*a* of movement path 52 is limited by stop 30.

Figure 7:
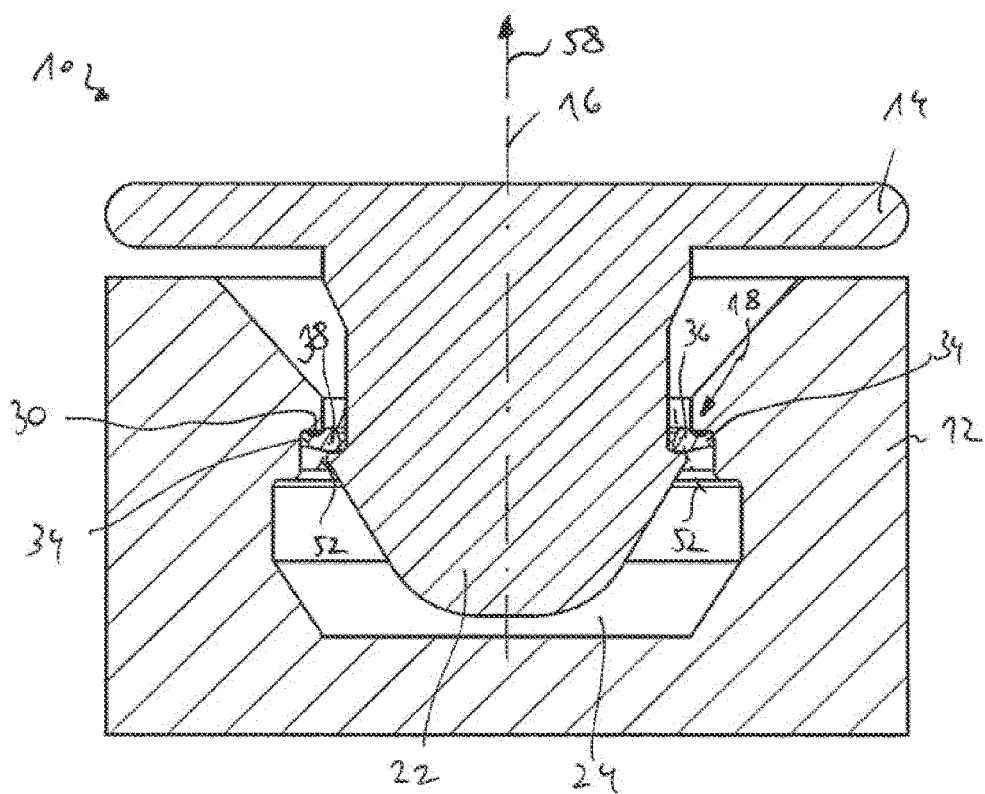
FIG. 7 is a vertical sectional view corresponding to FIG. 6 during a first phase of a disassembly process.
Figure 8:
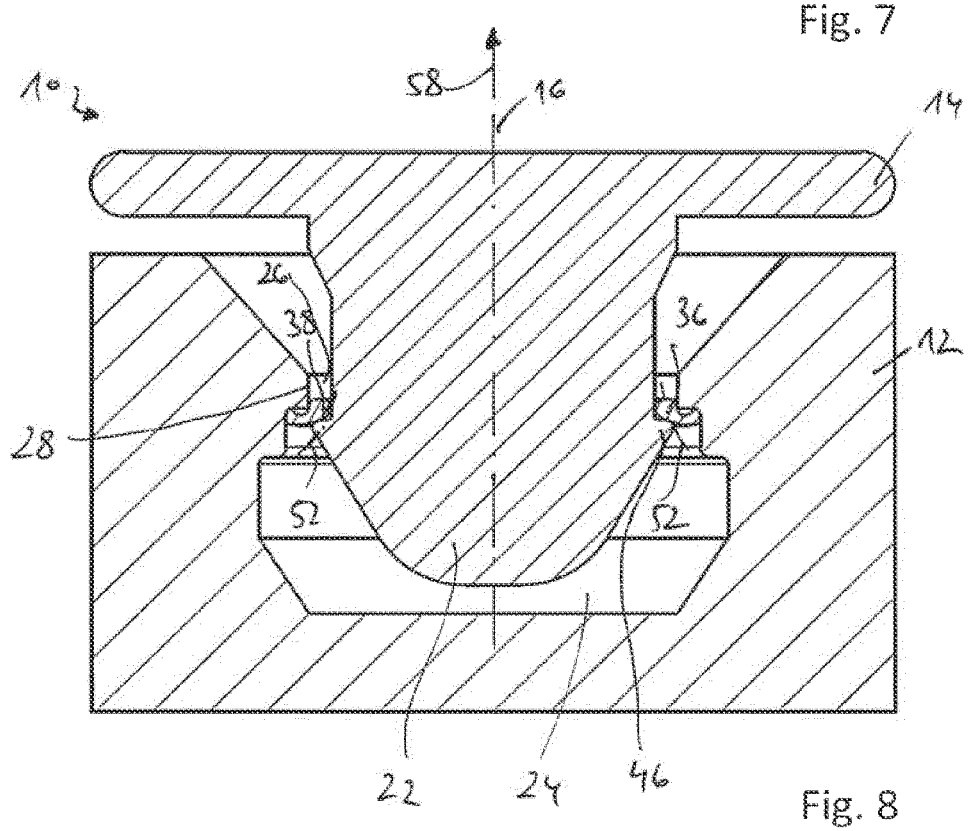
FIG. 8 is a vertical sectional view corresponding to FIG. 6 during a second phase of a disassembly process.

Starting from the assembled state shown in FIG. 6, the interlocking engagement of projection 46 with latching portions 36 and 38 in disassembly direction 58 causes latching portions 36 and 38 to pivot about or relative to mounting portion 34 with at least a component parallel to disassembly direction 58 until at least a portion of latching element 18 makes contact with stop 30 (see FIG. 7).

Further movement of second component 14 along disassembly direction 58 causes projection 46 of head 22 to be moved past first peripheral surface 28 with latching portion 36, 38 being located therebetween. As this occurs, latching portions 36, 38 may be locally squeezed for a short time in the annular space between the maximum diameter of projection 46 and first peripheral surface 28. When second component 14 is moved further along disassembly direction 58, projection 46 of head 22 finally moves out of engagement with entrance 26 of head receptacle 24, so that finally the disassembled state shown in FIGS. 3*a* and 3*b* is reached again, in which latching element 18 assumes its non-deformed rest state again due to its springiness.

The aforedescribed connection assembly 10 forms a snap fastener assembly. In the following, another embodiment of a connection assembly 10, which forms a container assembly, will be described with reference to FIGS. 9 and 10.

Figure 9:
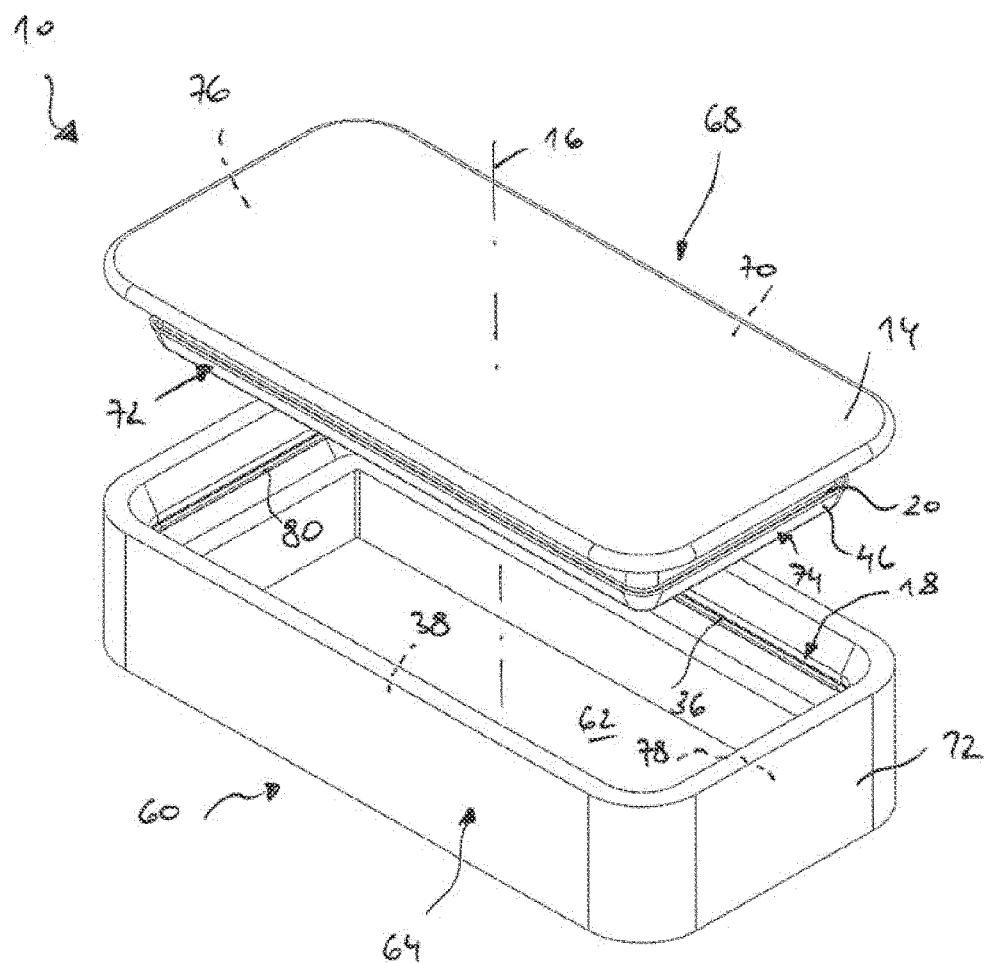
FIG. 9 is a perspective view showing another embodiment of a connection assembly in a disassembled state.
Figure 10:
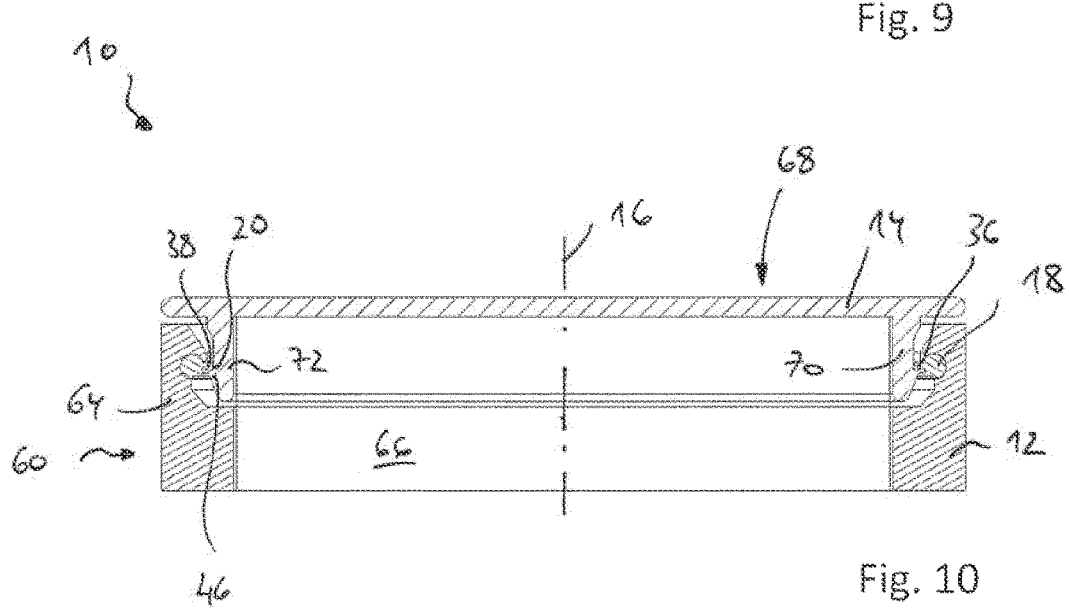
FIG. 10 is a vertical sectional view showing the embodiment of FIG. 9 in an assembled state.

In the connection assembly 10 according to FIGS. 9 and 10, first component 12 is formed by a receptacle 60 having a container bottom 62 and a container wall 64 extending circumferentially around container bottom 62. Container bottom 62 and container wall 64 bound a cavity 66 (see FIG. 10).

Second component 14 is formed by a cover 68 which, together with receptacle 60, forms a container assembly when in an assembled state, the cavity 66 of the container assembly being bounded in all spatial directions.

In the connection assembly 10 according to FIGS. 9 and 10, a latching element receptacle 20 and a projection of material 46 are disposed on webs which are disposed opposite each other in pairs, such as, for example, webs 70 and 72 and webs 74 and 76. Webs 70 through 76 collectively extend circumferentially about a central container axis, which corresponds to the axis of relative movement 16.

First component 12, which is in the form of receptacle 60, is provided with a latching element 18 which also extends along its circumference about the axis of relative movement 16. It has pairs of latching portions 36 and 38 and 78 and 80, which are respectively located opposite each other.

The webs 70 and 72 disposed opposite each other in a pair and/or the webs 74 and 76 disposed opposite each other in a pair preferably extend in straight lines, which may also be advantageous for other embodiments of a connection assembly 10.

The latching portions 36 and 38 disposed opposite each other in a pair and/or the latching portions 78 and 80 disposed opposite each other in a pair preferably extend in straight lines, which may also be advantageous for other embodiments of a connection assembly 10.

With regard to the assembly and disassembly of the connection assembly 10 according to FIGS. 9 and 10, reference is made to the above description of the connection assembly 10 according to FIGS. 1 through 8. This also applies to a further embodiment of a connection assembly 10 that will be described below with reference to FIGS. 11 and 12. In the following, only the features specific to the connection assembly 10 shown in FIGS. 11 and 12 will be described, which may also be used in all other connection assemblies 10.

Figure 11:
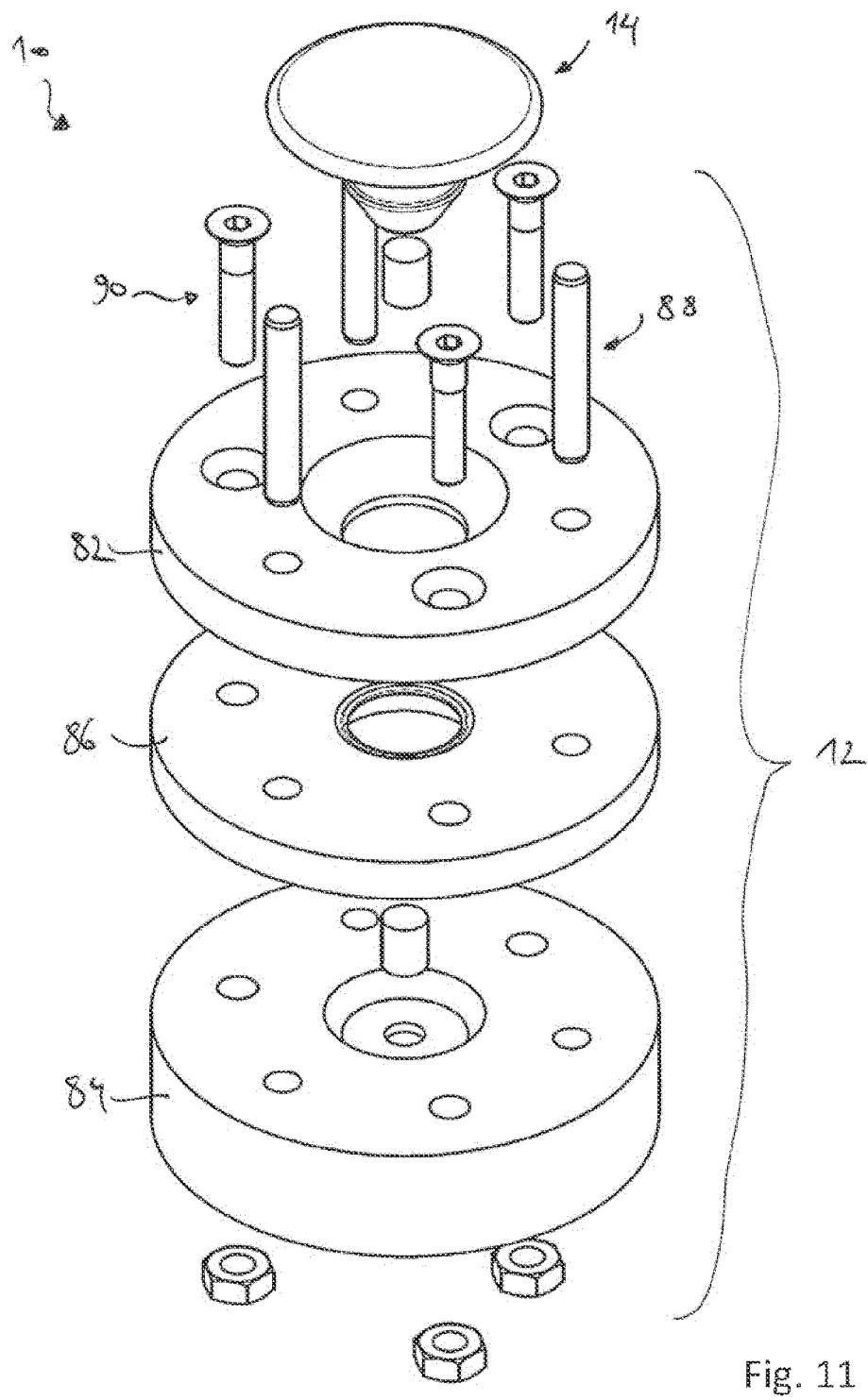
FIG. 11 is a perspective view showing a further embodiment of a connection assembly in a disassembled state.
Figure 12:
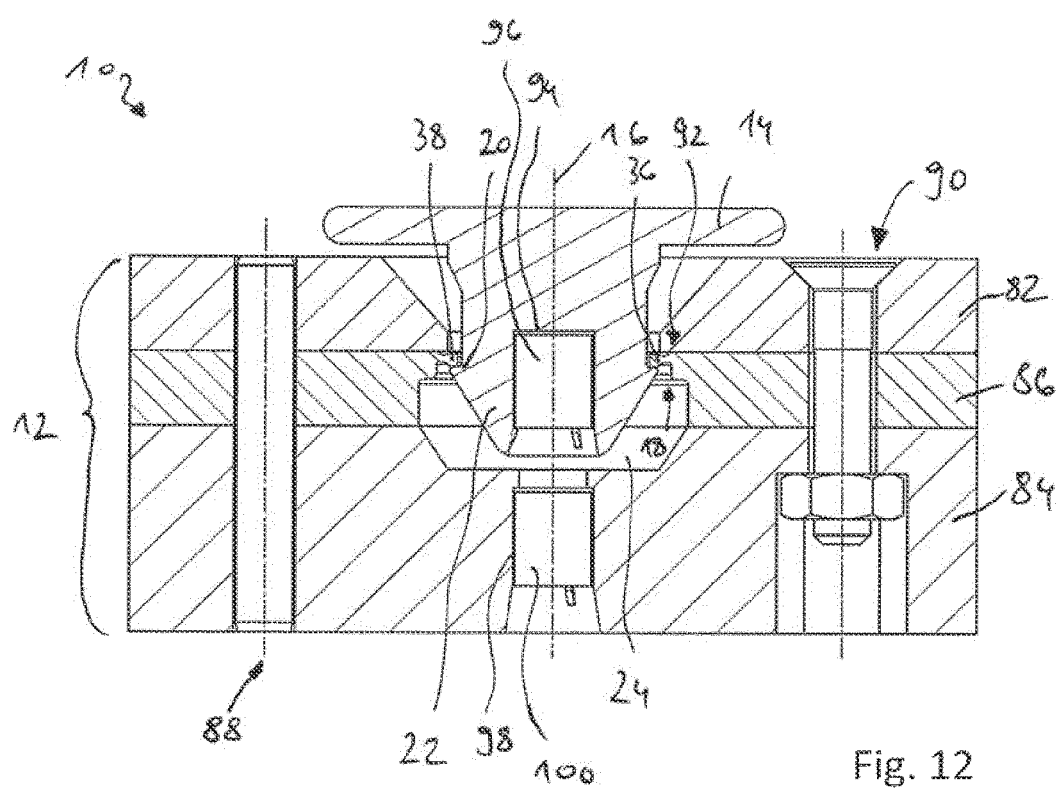
FIG. 12 is a vertical sectional view showing the embodiment of FIG. 11 in an assembled state.

In the connection assembly 10 according to FIGS. 11 and 12, the first component includes a plurality of layer-like elements. First component 12 includes two outer layers 82 and 84, which together bound an intermediate layer 86. Layers 82 through 86 are connected together by connecting devices, for example in the form of at least one threaded pin connection 88 and/or in the form of at least one bolt connection 90.

Intermediate layer 86 is made of a springy material and has a portion 92 which is formed in one piece with intermediate layer 86 and which forms an annular latching element 18.

Another specific feature of the connection assembly 10 according to FIGS. 11 and 12 is that second component 14 has a recess 94, for example in the region of head 22, which may serve to accommodate a third component 96, for example a (first) sensor element.

It is possible that first component 12 may have a receiving space 98, for example adjacent to a head receptacle 24, which serves to accommodate a further component 100, for example a (second) sensor element, the further component optionally cooperating with the third component 96 disposed on second component 14.

Like the embodiment of FIGS. 1 through 8, the further embodiment of a connection assembly 10 shown in FIGS. 13 through 18 is a snap fastener assembly.

The connection assembly 10 according to FIGS. 13 to 18 includes a first component 12 having a head 22 and a second component 14 having a head receptacle 24. Head 22 extends from a free end 54 up to a projection of material 46, adjacent to which is a radially inwardly offset peripheral surface of a stem 44. A latching element 18 extending annularly about the axis of relative movement 16 is disposed in a transition region between the projection of material 46 and stem 44.

Latching element 18 is fixedly secured by a mounting portion 34 in the mentioned region of first component 12 and extends along a plane 40 that is oblique to the axis of relative movement 16 when viewed in a cross-sectional plane parallel to the axis of relative movement 16. Latching element 18 includes latching portions 36, 38 which are disposed radially outwardly relative to mounting portion 34 and which may each extend over an angle of 180° about the axis of relative movement 16 and may complement each other to form an overall annularly closed latching portion.

The orientation of plane 40 is relative to a non-deformed rest state of latching element 18. Starting from the rest state of latching element 18, latching portions 36, 38 are pivotable about or relative to mounting portion 34 along a first portion 52a of movement path 52 up to a stop 30 formed by the projection of material 46 of head 22. Furthermore, latching portions 36, 38 are pivotable, starting from the rest state, along a second portion 52b of movement path 52; i.e., in a direction toward stem 44.

Second component 14 has a funnel-shaped abutment surface 106 which extends conically about the axis of relative movement 16 and leads into an entrance 26 of head receptacle 24. Entrance 26 is circumferentially bounded by a first peripheral surface 28. First peripheral surface 28 is formed by a radially inwardly extending projection of material 108, which has an undercut surface 110 formed on its side facing away from abutment surface 106, the undercut surface 110 extending from first peripheral surface 28 radially outwardly up to a second peripheral surface 32 of head receptacle 24. Undercut surface 110 forms a latching element receptacle 20 for latching portions 36, 38 of latching element 18.

Figure 13:
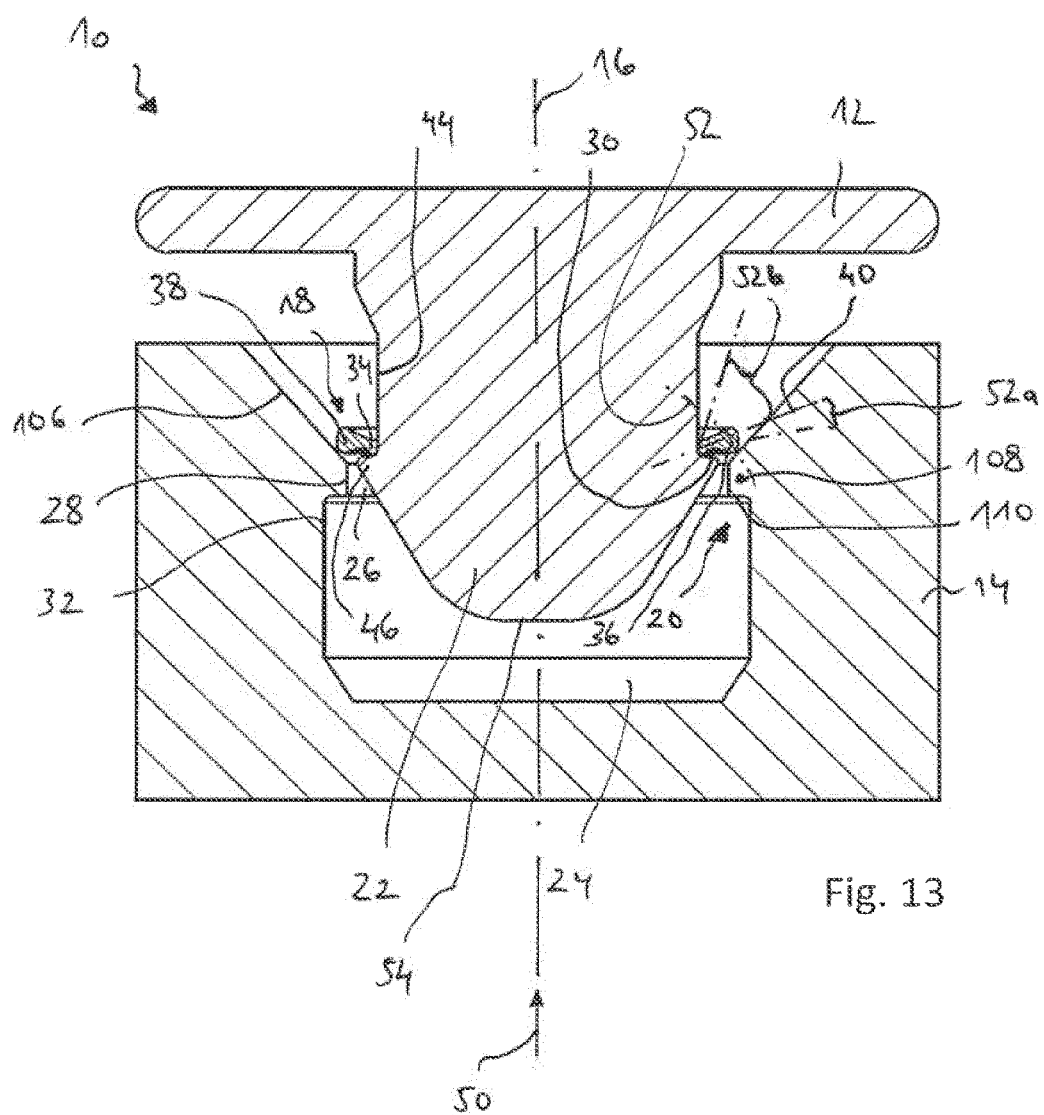
FIG. 13 is a vertical sectional view showing a further embodiment of a connection assembly in a disassembled state.

First component 12 and the second component can be joined together, starting from the disassembled state of connection assembly 10 shown in FIG. 13. In this context, an assembly direction 50 oriented parallel to the axis of relative movement 16 is relative to second component 14. However, it is of course also possible that second component 14 is not moved and that only the first component is moved, or that both components 12 and 14 are moved toward each other. However, when seen from second component 14, the resulting assembly direction 50 is always that shown in FIG. 13 and refers to the movement of second component 14 relative to first component 12.

Figure 14:
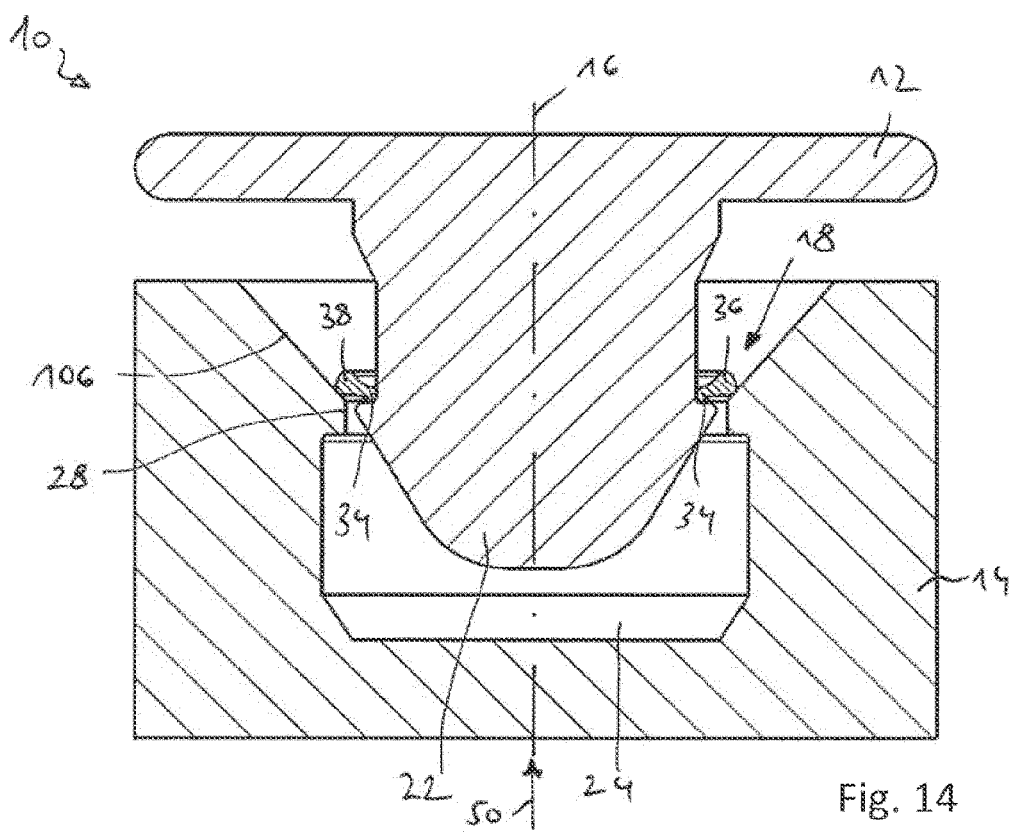
FIG. 14 is a vertical sectional view corresponding to FIG. 13 during a first phase of an assembly process.
Figure 15:
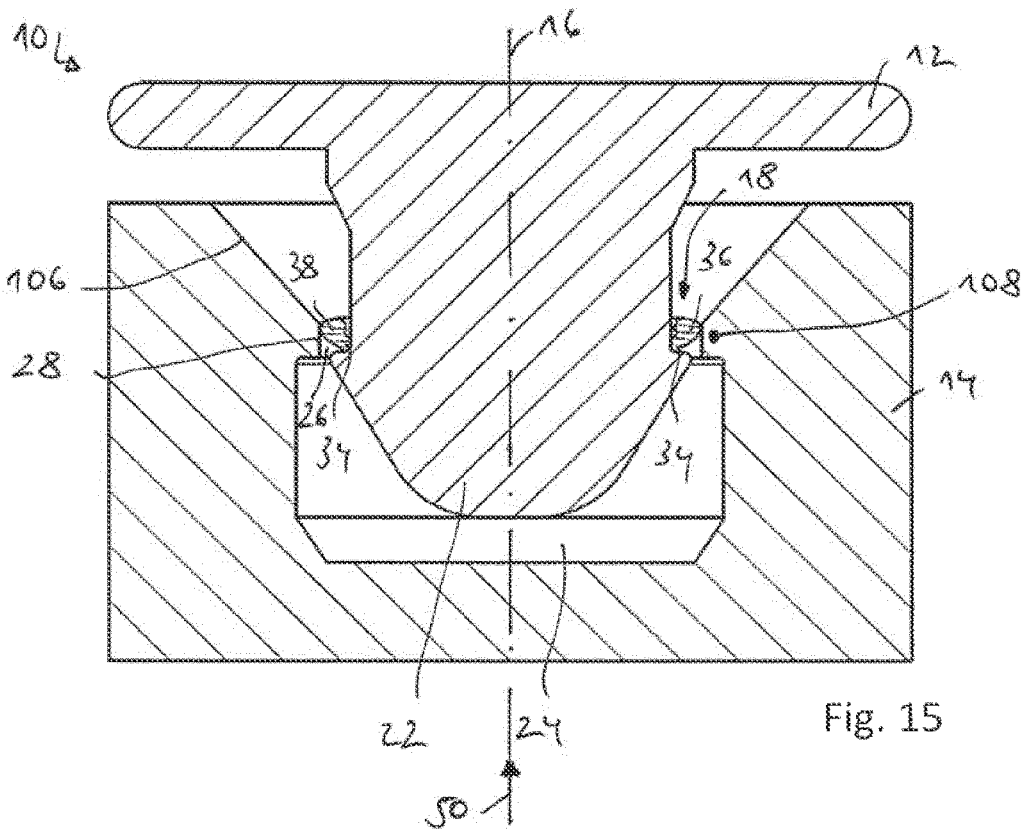
FIG. 15 is a vertical sectional view corresponding to FIG. 13 during a second phase of an assembly process.

Starting from the disassembled state shown in FIG. 13, a movement of components 12 and/or 14 as described above causes latching portions 36, 38 of latching element 18 to make contact with abutment surface 106 and to be pivoted about or relative to mounting portions 34 along second portion 52b of movement path 52, starting from the non-deformed rest state of the latching element 18 (see FIG. 14).

In a subsequent assembly phase (see FIG. 15), head 22 is inserted into head receptacle 24 to such an extent that latching portions 36, 38 of latching element 18 are no longer in contact with abutment surface 106, but have been pivoted along their second portions 52b of movement path 52 to a point where they enter into entrance 26 of head receptacle 24, which is bounded by first peripheral surface 28.

At the end of the assembly process, head 22 has been received into head receptacle 24 to such an extent that latching portions 36, 38 of latching element 18 move out of engagement with the first peripheral surface 28 of the projection of material 108 and are received in latching element receptacle 20. As this occurs, latching element 18 preferably assumes a non-deformed (relaxed) rest state again.

In this assembled state of connection assembly 10, latching portions 36, 38 may contact undercut surface 110 or be spaced a small distance from this undercut surface 110. Such a distance may be defined, for example, by end face 54 of head 22 resting against a boundary surface 56 of head receptacle 24 and/or by disposition of a sealing element 57 which annularly surrounds the axis of relative movement 12 and which provides a sealing effect between first component 12 and second component 14 (see FIG. 16).

Figure 16:
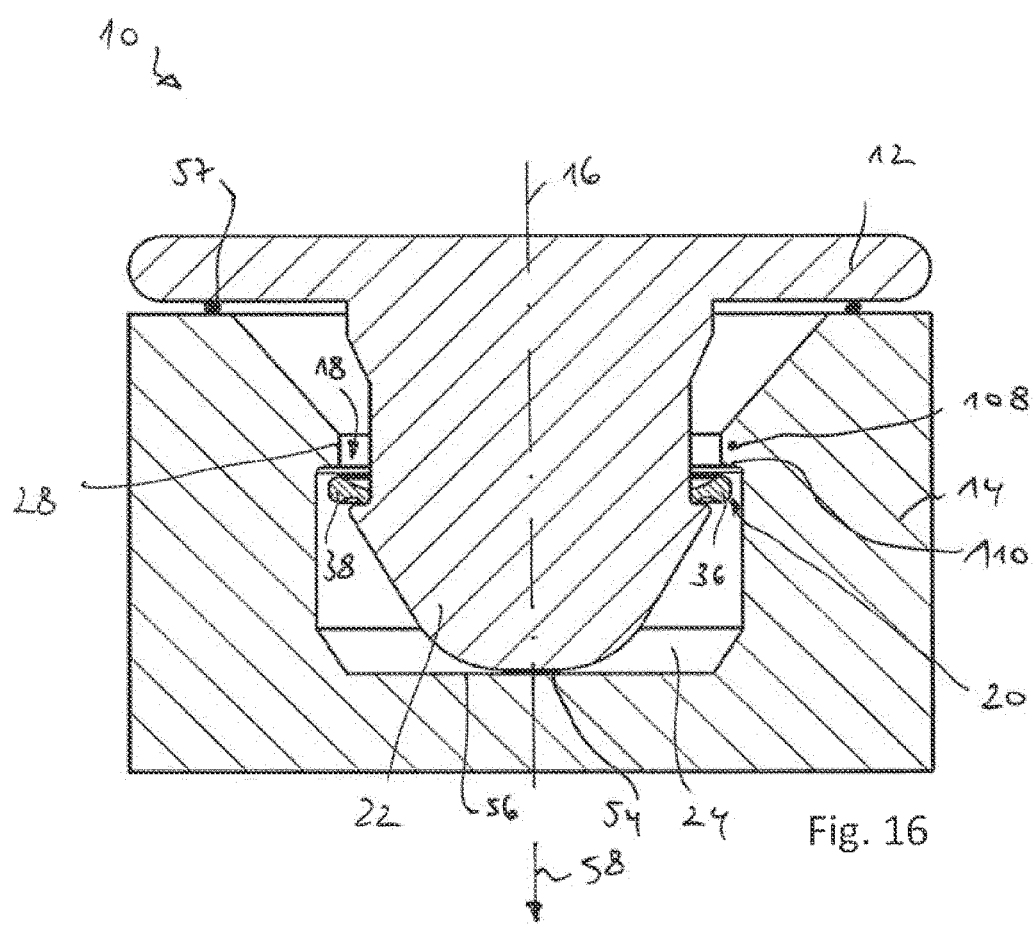
FIG. 16 is a vertical sectional view showing the embodiment of FIG. 13 in an assembled state.
Figure 17:
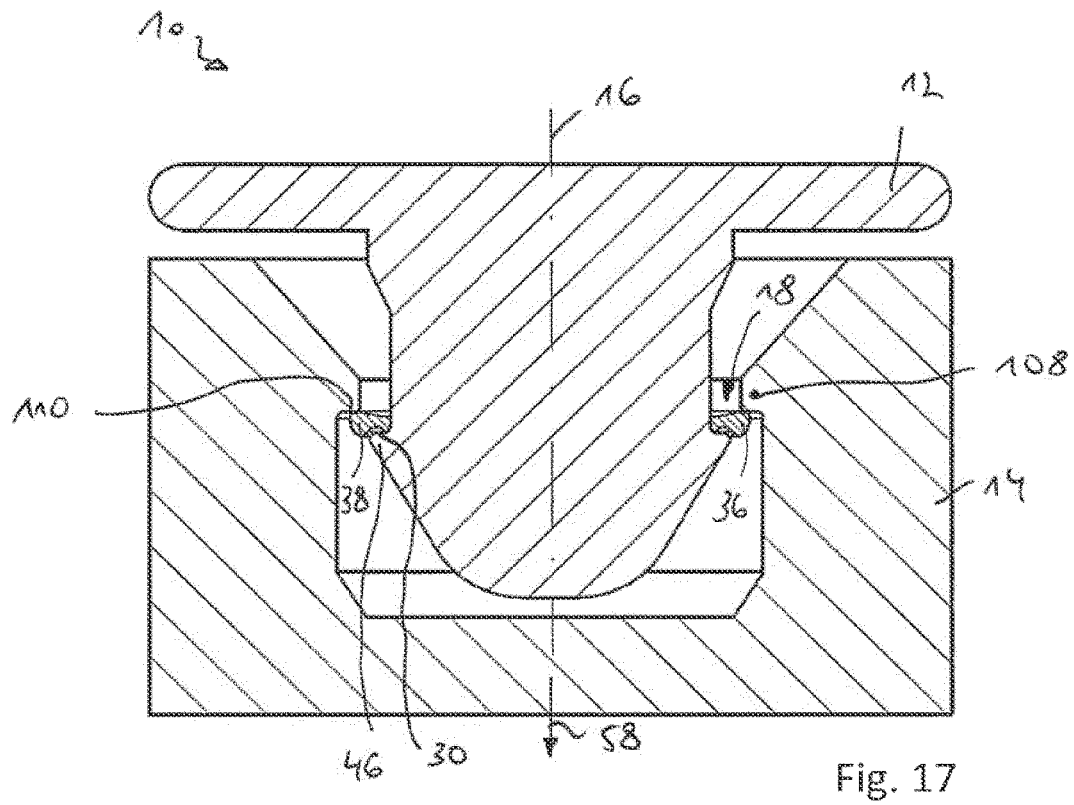
FIG. 17 is a vertical sectional view corresponding to FIG. 16 during a first phase of a disassembly process.

Starting from the assembled state of connection assembly 10 shown in FIG. 16, disassembly is carried out in a disassembly direction denoted by 58 with respect to second component 14. As discussed above, it is possible that in the assembled state of connection assembly 10, latching portions 36, 38 may be in contact with undercut surface 110 or be spaced a distance from undercut surface 110. In case such a distance is provided, this distance is reduced in the first disassembly phase until latching portions 36, 38 make contact with undercut surface 110. During this phase, latching element 18 remains in its non-deformed rest state. Once the latching portions 36, 38 are in contact with undercut surface 110, further relative movement of the components 12 and 14 along the axis of relative movement 16 causes latching portions 36, 38 to deform along the first portion 52a of movement path 52 (see FIG. 13) until latching portions 36, 38 make contact with the stop 30 formed by the projection of material 46 (see FIG. 17).

Figure 18:
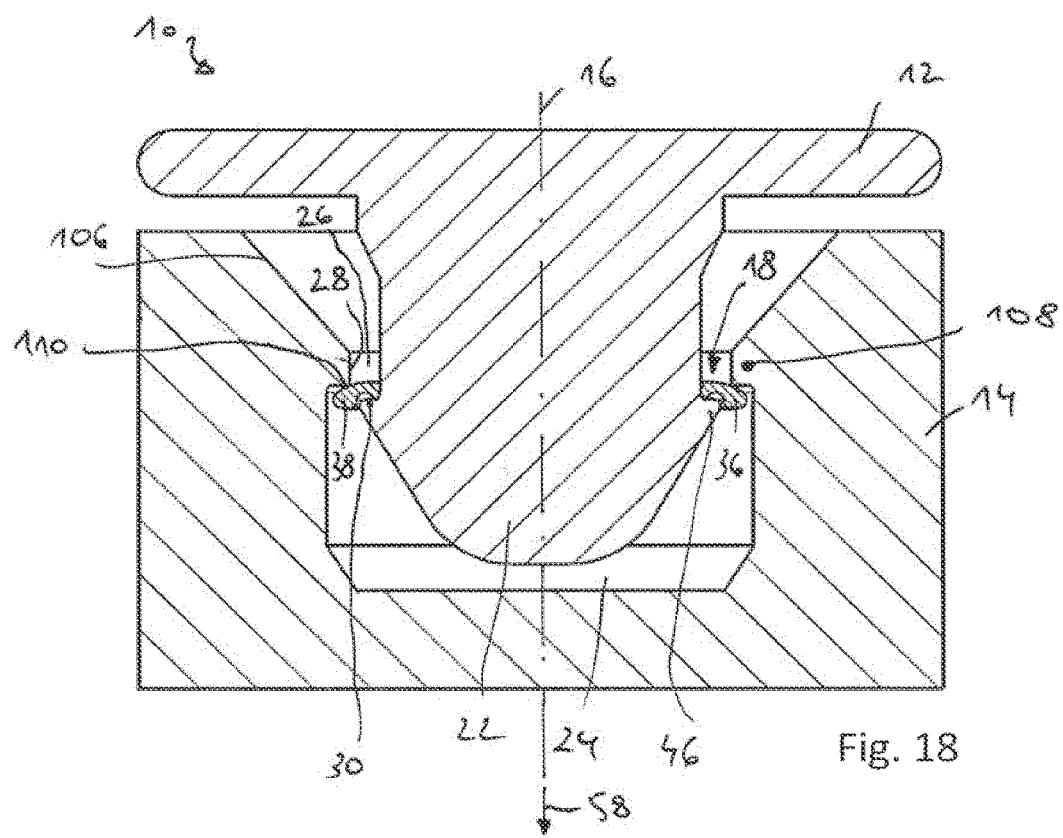
FIG. 18 is a vertical sectional view corresponding to FIG. 16 during a second phase of a disassembly process.

Further movement of components 12 and 14 along the axis of relative movement 16 beyond the state shown in FIG. 18 causes latching portions 36, 38 to move out of contact with undercut surface 110 and to then enter into the annular region of the entrance 26 of head receptacle 24, thereby being disposed between first peripheral surface 28 of second component 14 and the projection of material 46 of first component 12. Depending on the relative sizes, latching portions 36 and 38 may also be temporarily squeezed in the gap between projection 46 and projection 108 during this process.

Further relative movement then causes latching portions 36, 38 to move out of engagement with first peripheral surface 28 and, finally, to be spaced a distance from abutment surface 106, so that latching element 18 can assume its non-deformed rest state again (see FIG. 13).

Figure 19:
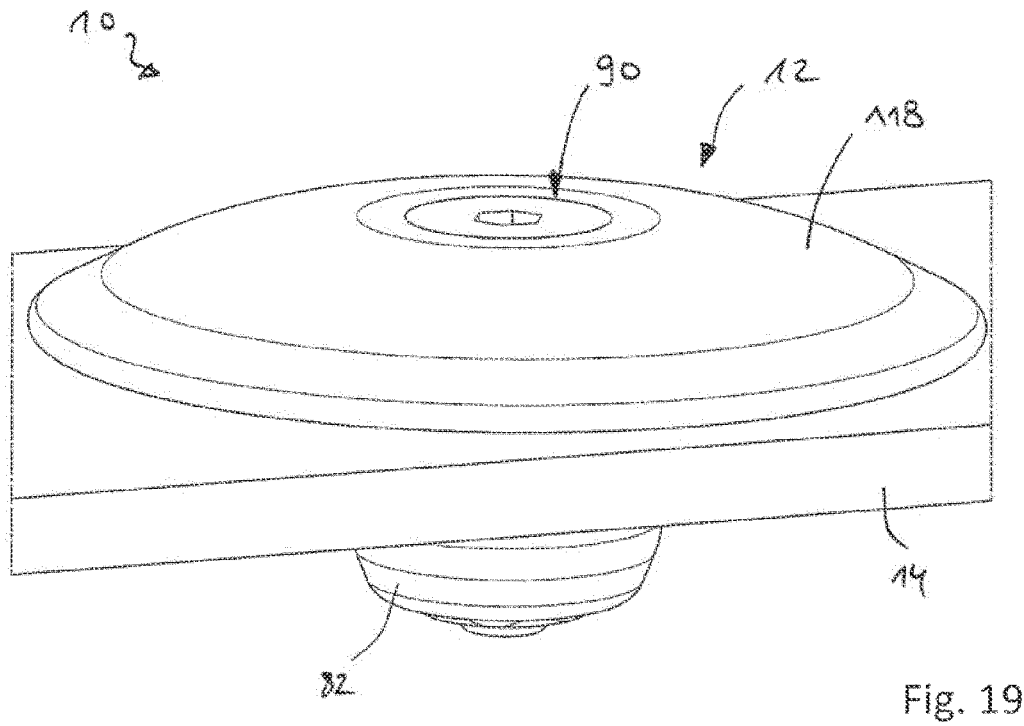
FIG. 19 is a perspective view showing another embodiment of a connection assembly in an assembled state.
Figure 20:
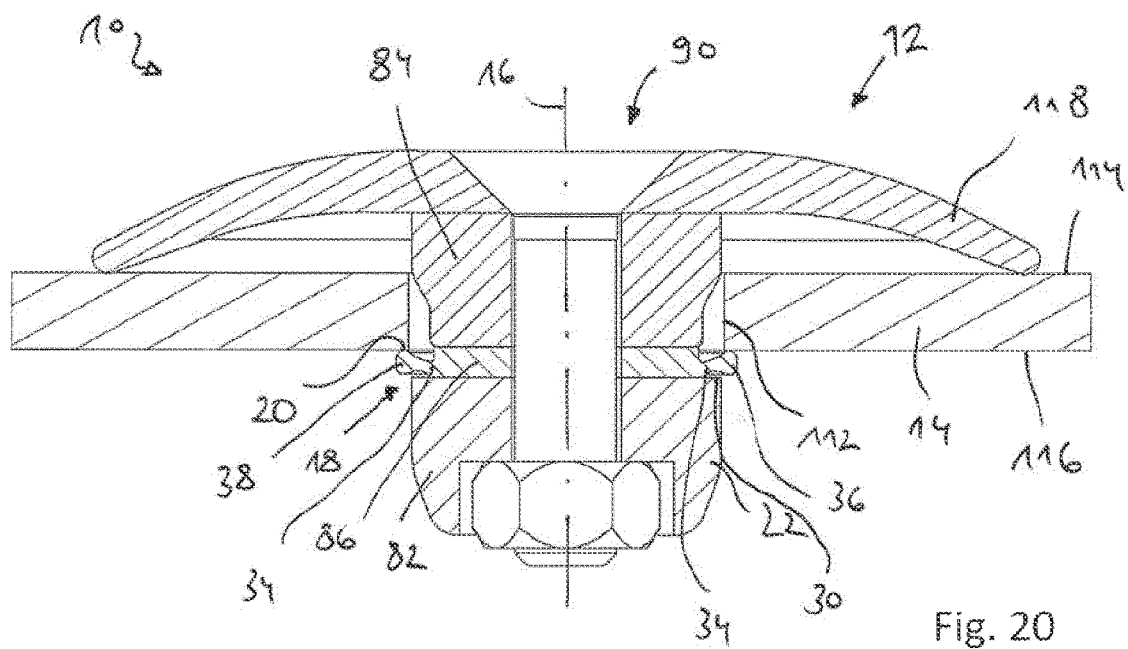
FIG. 20 is a vertical sectional view showing the embodiment of FIG. 19 in the assembled state.

A further embodiment of a connection assembly 10, shown in FIGS. 19 and 20, can in principle also be repeatably assembled and disassembled as described above with reference to the connection assembly 10 of FIGS. 13 through 18. A specific feature of the embodiment of FIGS. 19 and 20 is that second component 14 is formed by a wall section, which has a through-hole 112 extending between outer sides 114 and 116 facing away from each other. In the region of one of the edges of through-hole 112, one of the outer sides 114 and 116, for example outer side 116, forms a latching element receptacle 20 for a latching element 18 of first component 12.

First component 12 is composed of a plurality of layers, for example, of outer layers 82 and 84, an intermediate layer 86, and a cover layer 118 which covers a portion of outer side 114 of second component 14. The mentioned layers are annular, extend about the axis of relative movement 16, and are fixed to one another by means of a bolt connection 90. Intermediate layer 86 forms a latching element 18 in a radially outer region with respect to the axis of relative movement 16, the latching element having latching portions 36 and 38 which face away from each other and which may be provided separately from each other or may complement each other to form a circumferentially closed shape.

An annular surface of outer layer 82 which extends perpendicularly to the axis of relative movement 16 forms a stop 30 for latching portions 36, 38 of latching element 18, which, starting from the non-deformed rest state of latching element 18 shown in FIG. 20, can pivot along a first movement path (see FIG. 13) up to stop 30. In other respects, reference is made to the above description of the design and operation of the connection assembly 10 of FIGS. 13 and 18.

Figure 21:
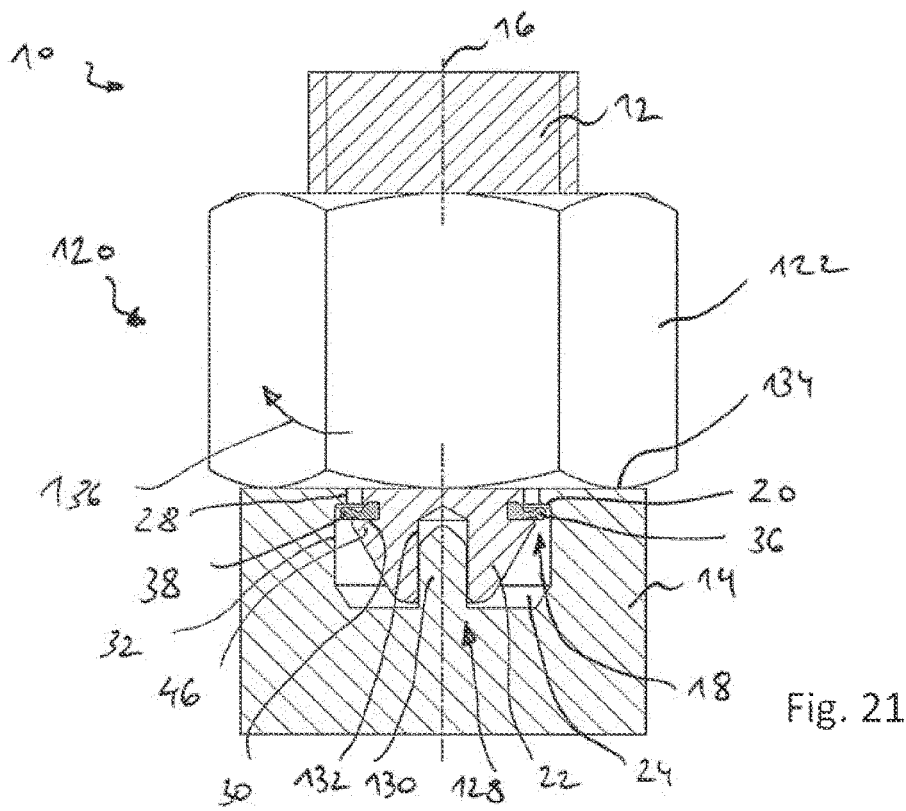
FIG. 21 is a vertical sectional view showing a further embodiment of a connection assembly in an assembled state.
Figure 22:
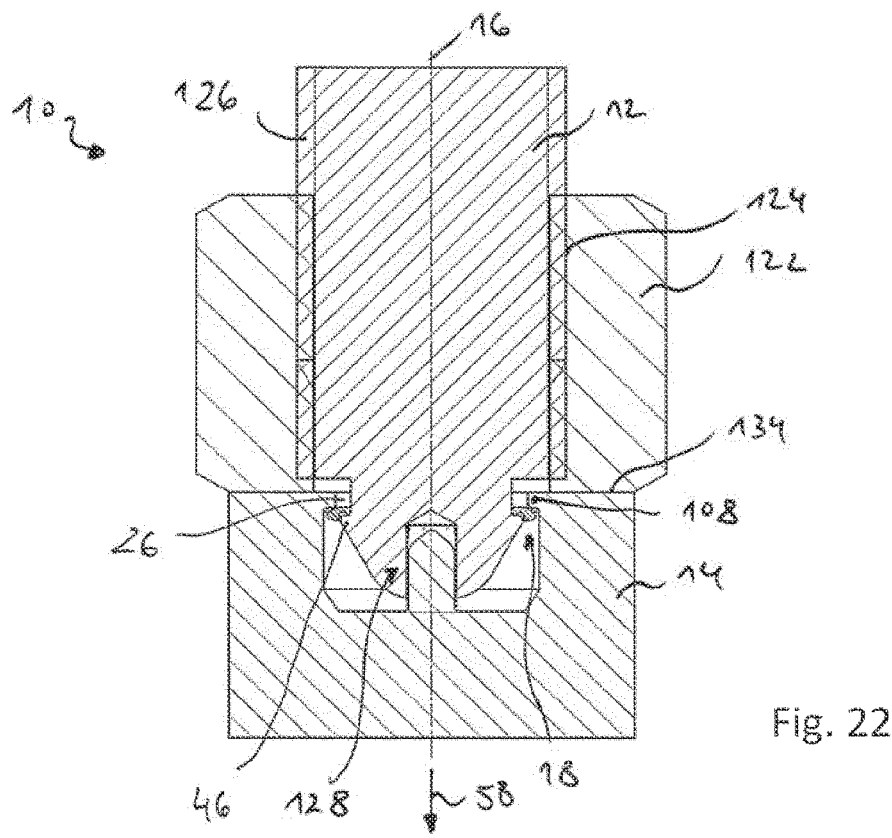
FIG. 22 is a vertical sectional view corresponding to FIG. 21 during a disassembly process.

An embodiment of a connection assembly 10 illustrated in FIGS. 21 and 22 has the following specific features which go beyond the aforementioned embodiments:

For purposes of adjusting a relative position between first component 12 and second component 14, an adjusting device 120 in the form of a threaded nut 122 is provided. Threaded nut 122 has an internal thread 124 which cooperates with an external thread 126 of a first component 12, which carries latching element 18.

Threads 124, 126 extend parallel to the axis of relative movement 16, preferably concentrically with the axis of relative movement 16.

First component 12 has a head 22 which is received in a head receptacle 24 of second component 14 when connection assembly 10 is in the assembled state. For purposes of guiding the first component along the axis of relative movement 16 and relative to second component 14, a guide device 128 is provided which includes a guide pin 130 and a pin receptacle 132. Pin 130 and pin receptacle 132 are preferably disposed concentrically with the axis of relative movement 16.

When connection assembly 10 is in the assembled state, latching portions 36, 38 of latching element 18 are engaged with latching element receptacle 20 of second component 14. In this condition, an end face of threaded nut 122 is in contact with a support surface 134 of second component 14. Starting from the assembled state shown in FIG. 21, the relative position between components 12 and 14 can be adjusted by turning threaded nut 122. If threads 124 and 126 are right-hand threads, rotation of threaded nut 122 about the axis of relative movement 16 in a direction of rotation indicated by 136 in FIG. 21 causes first component 12 to move along the axis of relative movement 16 away from second component 14, which is indicated in FIG. 22 by disassembly direction 58 with respect to the second component. By adjusting the adjusting device 120 as mentioned above, latching portions 36, 38 of latching element 18 are pivoted, starting from the rest state shown in FIG. 21, along a first portion 52a of a movement path 52 (for analogy see FIG. 1) until latching portions 36, 38 make contact with the stop 30 of the projection of material 46 of first component 12.

Further actuation in screwing direction 136 causes the latching portions 36, 38 located between the projection of material 108 and stop 30 to be deformed and/or squeezed (see FIG. 22). With further actuation in screwing direction 136, latching portions 36, 38 enter into the annular region of entrance 26 between the first peripheral surface 28 of second component 14 and the projection of material 46 of first component 12. With further actuation in screwing direction 136, latching portions 36, 38 finally move out of engagement with entrance 26, and a disassembled state of connection assembly 10 is reached.

Thus, adjusting device 120 is suitable both for fine adjustment of the relative position between components 12 and 14, and as a disassembly device which separates first component 12 from second component 14 in a manner comparable to a puller.

Figure 23:
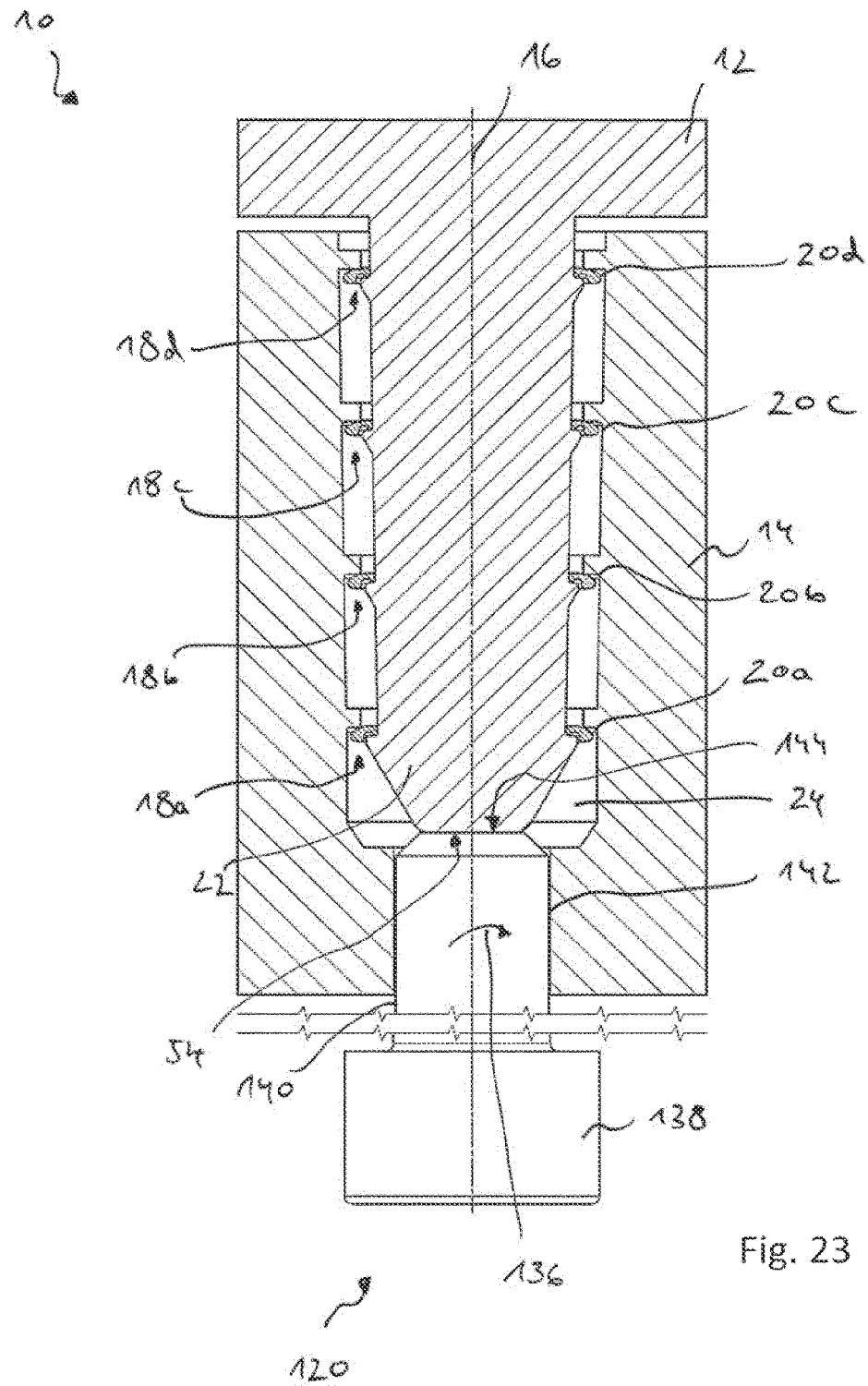
FIG. 23 is a vertical sectional view showing a further embodiment of a connection assembly during a disassembly process.

A connection assembly 10 shown in FIG. 23 also includes an adjusting device 120, which takes the form of an adjusting screw 138. This adjusting screw preferably extends concentrically with the axis of relative movement 16 and has an external thread 140 which cooperates with an internal thread 142 of second component 14. An end face 144 of adjusting screw 138 is in contact with an end face 54 of a head 22 of first component 12.

First component 12 carries at least one latching element 18, preferably a plurality of latching elements, which are identified in FIG. 23 by reference numerals 18a, 18b, 18c, 18d by way of example. These latching elements cooperate with respective latching element receptacles associated therewith, which are designated in FIG. 23 by reference numerals 20a, 20b, 20c, 20d.

If threads 140, 142 are right-hand threads, rotation in a direction of rotation 136 of adjusting screw 138 causes end face 144 to press more strongly against the end face of head 22 of first component 12, whereby first component 12 can be adjusted in its position relative to second component 14 and/or pushed away from second component 14.

The use of an adjusting device 120 is particularly suitable for connection assemblies 10 which have relatively high holding forces, for example when a plurality of latching elements 18 are used.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A connection assembly, comprising:
   a first component and a second component which are joinable to each other along an axis of relative movement, starting from a separated disassembled state, into an interconnected assembled state, and which are transferable back into the disassembled state, the first component having at least one latching element which surrounds the axis of relative movement in an annular or segment-shaped manner, and the second component having at least one latching element receptacle which surrounds the axis of relative movement in an annular or segment-shaped manner and cooperates with at least two latching portions of the at least one latching element in the assembled state, the latching portions being offset relative to each other when viewed in a circumferential direction, wherein the at least two latching portions of the at least one latching element are each movable along a movement path starting from a non-deformed rest state, the movement path having at least a component parallel to the axis of relative movement, a first portion of the movement path pointing in a disassembly direction with respect to the rest state, and a second portion of the movement path pointing in an assembly direction opposite the disassembly direction with respect to the rest state, the first portion of the movement path being limited by at least one stop against which the at least one latching element rests in a course of disassembling the first and second components, and wherein, in the rest state, the at least one latching element extends along a plane that is oblique to the axis of relative movement when viewed in a cross-sectional plane parallel to the axis of relative movement.

2. The connection assembly as recited in claim 1, wherein a length of the first portion of the movement path differs from a length of the second portion of the movement path.

3. The connection assembly as recited in claim 2, wherein the length of the first portion of the movement path is shorter than the length of the second portion of the movement path.

4. The connection assembly as recited in claim 1, wherein the at least one stop is disposed on the first component.

5. The connection assembly as recited in claim 1, wherein the latching element is springy in its entirety or at least in a portion thereof.

6. The connection assembly as recited in claim 1, wherein the at least one latching element extends between a mounting portion and a free end when viewed in a cross-sectional plane parallel to the axis of relative movement, the mounting portion being annularly shaped and connected to the first component, and the free end being pivotable relative to the mounting portion along the movement path or parallel to the movement path.

7. The connection assembly as recited in claim 6, wherein a first pivot angle corresponding to the first portion of the movement path is at least about 5° and/or no more than about 100°.

8. The connection assembly as recited in claim 6, wherein a second pivot angle corresponding to the second portion of the movement path is at least about 10°.

9. The connection assembly as recited in claim 1, wherein the latching element receptacle is formed by a projection of material which extends in a radial direction relative to the axis of relative movement and which forms an undercut configured to receive a latching portion in the assembled state of the connection assembly.

10. The connection assembly as recited in claim 1, wherein the connection assembly is a snap fastener assembly, wherein:
the first component has a head and the second component has a head receptacle, or
the first component has a head receptacle and the second component has a head.

11. The connection coupling assembly as recited in claim 1, wherein the connection assembly is a container assembly, wherein:
the first component is in the form of a receptacle bounding a cavity and the second component is in the form of a cover, or
the first component is in the form of a cover and the second component is in the form of a receptacle bounding a cavity.

12. The connection assembly as recited in claim 1, wherein, in the rest state, the at least two latching portions of the at least one latching element are spaced at a distance from the at least one stop.

13. The connection assembly as recited in claim 12, configured such that, during the course of the disassembling of the first and second components, a disassembly force increases after the at least two latching portions of the at least one latching element make contact with the at least one stop.

14. A connection assembly, comprising:
a first component and a second component which are joinable to each other along an axis of relative movement, starting from a separated disassembled state, into an interconnected assembled state, and which are transferable back into the disassembled state, the first component having at least one latching element which surrounds the axis of relative movement in an annular or segment-shaped manner, and the second component having at least one latching element receptacle which surrounds the axis of relative movement in an annular or segment-shaped manner and cooperates with at least two latching portions of the at least one latching element in the assembled state, the latching portions being offset relative to each other when viewed in a circumferential direction; and
at least one sealing element which annularly surrounds the axis of relative movement and which provides a sealing effect between the first component and the second component in the assembled state of the connection assembly,
wherein the at least two latching portions of the at least one latching element are each movable along a movement path starting from a non-deformed rest state, the movement path having at least a component parallel to the axis of relative movement, a first portion of the movement path pointing in a disassembly direction with respect to the rest state, and a second portion of the movement path pointing in an assembly direction opposite the disassembly direction with respect to the rest state, the first portion of the movement path being limited by at least one stop against which the at least one latching element rests in a course of disassembling the first and second components.

15. The connection assembly as recited in claim 1, wherein the first component and/or the second component have/has a recess or cut-out configured to accommodate a third component, and/or an opening for passage of a fluid therethrough.

16. The connection assembly as recited in claim 14, wherein a spacing between the at least two latching portions of the at least one latching element and an undercut formed by the latching element receptacle is defined by the at least one sealing element.

17. A connection assembly, comprising:
a first component and a second component which are joinable to each other along an axis of relative movement, starting from a separated disassembled state, into an interconnected assembled state, and which are transferable back into the disassembled state, the first component having at least one latching element which surrounds the axis of relative movement in an annular or segment-shaped manner, and the second component having at least one latching element receptacle which surrounds the axis of relative movement in an annular or segment-shaped manner and cooperates with at least two latching portions of the at least one latching element in the assembled state, the latching portions being offset relative to each other when viewed in a circumferential direction; and an adjusting device that is at least indirectly connected to the first component or to the second component, wherein a relative position of the first component and the second component is adjustable along the axis of relative movement by the adjusting device in the assembled state of the connection assembly, wherein the at least two latching portions of the at least one latching element are each movable along a movement path starting from a non-deformed rest state, the movement path having at least a component parallel to the axis of relative movement, a first portion of the movement path pointing in a disassembly direction with respect to the rest state, and a second portion of the movement path pointing in an assembly direction opposite the disassembly direction with respect to the rest state, the first portion of the movement path being limited by at least one stop against which the at least one latching element rests in a course of disassembling the first and second components.

18. The connection assembly as recited in claim 17, wherein the adjusting device is configured to act as a disassembly device which transfers the connection assembly from the assembled state into the disassembled state.

19. The connection assembly as recited in claim 17, wherein the adjusting device comprises a threaded coupling having a coupling axis that extends parallel to or in line with the axis of relative movement, and wherein a first thread portion is associated with a screwing element and a second thread portion threadingly coupled with the first thread portion is associated with the first or the second component.

20. A method for assembling or disassembling components with the connection assembly according to claim 1, the method comprising:

assembling or disassembling the components by the connection assembly during manufacture and/or operation of a technical medical device.

* * * * *